US010823557B2

(12) United States Patent
Westermark et al.

(10) Patent No.: US 10,823,557 B2
(45) Date of Patent: Nov. 3, 2020

(54) GEODETIC INSTRUMENT WITH REDUCED DRIFT

(71) Applicant: Trimble AB, Danderyd (SE)

(72) Inventors: Magnus Westermark, Ekerö (SE); Thomas Klang, Sollentuna (SE)

(73) Assignee: Trimble AB, Danderyd (SE)

( * ) Notice: Subject to any disclaimer, the term of this patent is extended or adjusted under 35 U.S.C. 154(b) by 0 days.

(21) Appl. No.: 16/874,496

(22) Filed: May 14, 2020

(65) Prior Publication Data
US 2020/0271446 A1 Aug. 27, 2020

Related U.S. Application Data

(63) Continuation of application No. PCT/EP2018/050748, filed on Jan. 12, 2018.

(51) Int. Cl.
G01C 3/08 (2006.01)
G01C 1/02 (2006.01)
G01C 15/00 (2006.01)

(52) U.S. Cl.
CPC .............. G01C 1/02 (2013.01); G01C 15/002 (2013.01)

(58) Field of Classification Search
CPC ........... G01C 1/02; G01C 15/002; G01C 3/08
USPC ........................................................ 356/5.01
See application file for complete search history.

(56) References Cited

U.S. PATENT DOCUMENTS

| 2009/0133273 | A1* | 5/2009 | Westermark | ......... | G01C 15/002 33/281 |
| 2014/0009604 | A1* | 1/2014 | Hinderling | ........... | G01C 15/002 348/142 |
| 2015/0022885 | A1* | 1/2015 | Hutter | ..................... | G02B 7/08 359/426 |
| 2016/0080638 | A1* | 3/2016 | Kotzur | ................. | G01C 15/002 348/135 |

(Continued)

FOREIGN PATENT DOCUMENTS

| EP | 2 615 415 A2 | 7/2013 |
| EP | 2 615 415 A3 | 7/2013 |
| EP | 2 998 701 A1 | 3/2016 |

OTHER PUBLICATIONS

International Search Report and Written Opinion for Application No. PCT/EP2018/050748, dated Sep. 3, 2018, 14 pages.

(Continued)

Primary Examiner — Mark Hellner
(74) Attorney, Agent, or Firm — Kilpatrick Townsend & Stockton LLP

(57) ABSTRACT

The present disclosure provides a geodetic instrument (100) adapted to determine a direction and/or a distance to a target. The geodetic instrument includes an attachment device (120) for attaching the geodetic instrument to a holding arrangement (122); a motorized position arrangement for aiming a line of sight (L) of the geodetic instrument via rotation and/or translation of at least a part of the motorized position arrangement relative to the holding arrangement, and a controller (130). The controller is configured to, upon determining that a setting up of the geodetic instrument is required, provide a control sequence to the motorized positioning arrangement for causing a series of oscillatory rotational and/or translational movements of the at least a (Continued)

part of the motorized positioning arrangement. A method of setting up a geodetic instrument is also provided.

19 Claims, 4 Drawing Sheets

(56) References Cited

U.S. PATENT DOCUMENTS

2017/0219710 A1  8/2017  Schmidt et al.
2018/0292209 A1* 10/2018  von Matern ............ G01S 7/497

OTHER PUBLICATIONS

Written Opinion of the International Preliminary Examining Authority for Application No. PCT/EP2018/050748, dated Dec. 3, 2019, 5 pages.
Notification of Transmittal of the International Preliminary Report on Patentability for Application No. PCT/EP2018/050748, dated Mar. 11, 2020, 6 pages.

* cited by examiner

GEODETIC INSTRUMENT WITH REDUCED DRIFT

CROSS-REFERENCE TO RELATED APPLICATIONS

The present application is a continuation of International Application No. PCT/EP2018/050748, filed Jan. 12, 2018, the contents of which are incorporated herein by reference in their entirety of all purposes.

TECHNICAL FIELD

The present disclosure relates to a geodetic instrument and a method of setting up a geodetic instrument. More specifically, the present disclosure relates to the field of reducing or eliminating drift arising when operating such geodetic instruments.

BACKGROUND

Geodetic instruments may be used in various types of surveying, including for example stakeouts at construction sites. After mounting the geodetic instrument on e.g. a tripod, and after making sure that the geodetic instrument is leveled and e.g. located at the right location, the operator may proceed by defining the horizontal (or azimuthal) orientation of the coordinate system which is to be used. This may be achieved by the operator performing a so-called backsight reference measurement, in which the geodetic Instrument is aimed at a certain target and the then indicated azimuthal direction of the geodetic instrument is used as a reference for subsequent measurements. Performing the backsight reference measurement may complete a setting up of the geodetic instrument, after which the geodetic instrument is ready to measure towards other targets.

After having performed one or more measurements towards such other targets, the operator may find that a new backsight reference measurement towards the same certain target indicates a different azimuthal angle.

The drift of the backsight reference over time may introduce uncertainty and/or error in the measurements. There is therefore a need for an improved geodetic instrument and methods of operating the same.

SUMMARY

To at least partially satisfy the above need, the present disclosure seeks to provide an improved geodetic instrument and an improved method of setting up a geodetic instrument. In particular, the present disclosure provides a solution for operation of a geodetic instrument with reduced drift. To achieve this, a geodetic instrument and a method of setting up a geodetic instrument as defined in the independent claims are provided. Further embodiments of the present disclosure are provided in the dependent claims.

According to a first aspect of the present disclosure, a geodetic instrument is provided. The geodetic instrument may be adapted to determine a direction and/or a distance to a target. The geodetic instrument may include an attachment device for attaching the geodetic instrument to a holding arrangement.

The geodetic instrument may include a motorized positioning arrangement. The motorized positioning arrangement may be for aiming a line of sight of the geodetic instrument via rotation and/or translation of at least a part of the motorized positioning arrangement relative to the holding arrangement.

The geodetic instrument may include a controller. The controller may be configured to, upon determining that a setting up of the geodetic instrument is required, provide a control sequence to the motorized positioning arrangement for causing a series of oscillatory rotational and/or translational movements of the at least a part of the motorized positioning arrangement.

Frictional tension may build up in one or more parts of the holding arrangement, for example when the holding arrangement is assembled and/or pitched at a new location. The built up frictional tension may lead to a so called hysteresis in the holding arrangement. This may also apply to for example the attachment device, and it should be understood that frictional and hysteretical effects discussed herein with reference to the holding arrangement may apply also to the attachment device.

Hysteresis may be defined as the inability of a structure to return to its original position after having been subjected to one or more forces. For example, if a movement (e.g. a rotation) of the geodetic instrument causes a torsional rotation/twisting of e.g. a tripod, hysteresis may exist if the tripod does not, after the rotation of the geodetic instrument has stopped, return to the same position it had before the rotation of the geodetic instrument started.

It will for example be appreciated that the holding arrangement (and the attachment device) may for example include one or more adjustment joints. A rotation of the geodetic instrument may for example release at least part of a frictional tension in one of these joints, causing the joint to slide. After the rotation of the geodetic instrument has stopped, the frictional tension in this joint will not be the same and the position of the holding arrangement will have changed, thereby causing hysteresis.

Such hysteresis may be at least partly responsible for drift in operation of a geodetic instrument, such as e.g. azimuthal drift, where the backsight reference deviates with time (and also with temperature). By determining that a setup of the instrument is required and, based thereon, by causing a series of oscillatory rotational and/or translational movements of the at least a part of the motorized positioning arrangement, the geodetic instrument according to the present disclosure may help to reduce or cancel the effect of hysteresis in the holding arrangement. When the geodetic instrument is attached to the holding arrangement via the attachment device, the series of oscillatory translational and/or rotational movements may cause vibrations which may be transferred to the holding arrangement and/or the attachment device. The vibrations may cause a quicker release of e.g. frictional tension built up in the holding arrangement and/or the attachment device. By a quicker release of such frictional tension before the setup of the geodetic instrument is completed, the effects of hysteresis may be reduced or cancelled, leading to e.g. less or no subsequent azimuthal drift with time. It is envisaged also that hysteresis may cause drift in e.g. a tilting angle, or an elevation angle, of the geodetic instrument over time, and that the vibrations may help to reduce or eliminate also such drifts.

By using the motorized positioning arrangement, the vibrations may be induced in the holding arrangement (and e.g. in the attachment device) using the same components as are also used when aiming the line of sight of the geodetic instrument. This may allow to reduce and or remove the effects of hysteresis over time without adding further cost and/or complexity to the geodetic instrument.

In some embodiments, an envelope amplitude of the series of oscillatory rotational and/or translational movements may decrease with time. It may be envisaged that the holding arrangement and/or the attachment device may have an ideal state wherein no frictional tensions exist. This ideal state may be represented as a bottom of a well. When there is frictional tension, the actual state of the holding arrangement and/or the attachment device may be envisaged as being not at the bottom of the well, but somewhere up on a wall sloping towards the bottom. The vibrations caused by the oscillatory rotational and/or translational movements may help to "push" the state of the holding arrangement and/or the attachment device towards the ideal state at the bottom. Phrased differently, it may be envisaged that each vibration causes the actual state to move slightly towards the bottom. Decreasing the amplitude of these vibrations with time may help to prevent that the actual state of the holding arrangement and/or the attachment device is substantially pushed past the ideal state at the bottom, which would increase the time taken for the actual state to settle down at (or close to) the ideal state.

In some embodiments, the control sequence may follow a telegraph process. Herein, a "telegraph process" may be a process in which a variable randomly switches between two distinct values. The switching between the two distinct values may be governed by e.g. a Poisson distribution. For example, the variable may correspond to a control voltage to e.g. a motor of the positioning arrangement, and the control voltage may switch in a probabilistic fashion between two different voltages. It may also be envisaged that more than two distinct values are used.

In some embodiments, the series of oscillatory rotational and/or translational movements may have a constant power spectral density. It may be envisaged that the holding arrangement has one or more resonant frequencies at which the release of frictional tension is more efficient. A constant power spectral density, i.e. "white noise", may contain a plurality of frequencies, and the probability of hitting one or more of the resonant frequencies may therefore be increased. Here, it is envisaged also that the constant power spectral density may be bandwidth limited. A constant power spectral density may for example be achieved by using the telegraph process described above.

In some embodiments, the controller may be configured to determine a resonance frequency of the holding arrangement. The control sequence may be based upon the determined resonance frequency. By determining a resonance frequency of the holding arrangement, and by basing the control sequence on the determined resonance frequency, the release of built-up frictional tension in the holding arrangement may be quicker.

In some embodiments, the controller may be configured to determine a surface type on which the holding arrangement is positioned. The control sequence may be based upon the determined surface type. It is envisaged that the surface type on which the holding arrangement is positioned may influence the hysteresis caused by the holding arrangement. By taking the surface type into account, the release of the built-in friction (and thereby the reduction or removal of the hysteresis effects) may be improved.

In some embodiments, the controller may be configured to determine the surface type based on a location of the geodetic Instrument. The location of the geodetic instrument may for example be checked against a database or function which maps a certain position to a certain surface type. The controller may for example determine that the location of the geodetic instrument indicates that the geodetic instrument is, or is likely to be, located on e.g. a grass surface, and the control sequence may be adapted accordingly.

In some embodiments, the motor of the motorized positioning arrangement may be a brushless electromagnetic motor or a piezoelectric motor. Brushless electromagnetic motors, or piezoelectric motors, may provide motors which are for example less prone to frictional wear, and which are more controllable in terms of accuracy and precision.

In some embodiments, the attachment device may include a tribrach. A tribrach may help to more easily position and/or mount the geodetic instrument to the holding arrangement. The tribrach may for example be used for leveling purposes. In some embodiments, it may be envisaged that the attachment device does not include such a tribrach, but that the attachment device includes at least means for attaching the geodetic instrument to the tribrach.

In some embodiments, the geodetic instrument may be a total station. The total station may include a theodolite and an electronic distance measuring device. The theodolite may for example be used to determine the direction to the target, and the electronic distance measuring device may for example be used to determine the distance to the target.

In some embodiments, the motorized positioning arrangement may include an alidade. The alidade may be rotatably mounted on a base of the geodetic instrument. The attachment device may be configured to attach the base of the geodetic instrument to the holding arrangement.

In some embodiments, the alidade may form part of the at least a part of the motorized positioning arrangement. The series of oscillatory and/or vibrational movements may include oscillatory rotational movements of the alidade around a center axis. Herein, the center axis may be defined as the vertical axis of the geodetic instrument, i.e. the axis around which the geodetic instrument may be rotated to change an azimuthal angle with which the geodetic instrument is pointing.

In some embodiments, the at least a part of the motorized positioning arrangement may include a center unit. The center unit may be rotatably mounted on the alidade. The series of oscillatory rotational and/or translational movements may include oscillatory rotational movements of the center unit around a trunnion axis. A center unit may for example include devices which are to be aimed in a certain direction, such as an electronic distance meter, one or more lasers, one or more lenses, and similar. Herein, the trunnion axis may be defined as the horizontal axis of the geodetic instrument, i.e. the axis around which the center unit may be rotated to change an elevation angle with which the geodetic instrument is pointing.

In some embodiments, the controller may be configured to determine that the setting up of the geodetic instrument is required based on an input from a user (e.g. an operator of the geodetic Instrument). An input from the user may for example include the push of a button, a click on a screen, or the sending of a signal indicating that the setting up of the geodetic instrument is required to the controller.

In some embodiments, the controller may be configured to determine that the setting up of the geodetic instrument is required based on a location of the geodetic instrument. Determining that the setting up of the geodetic instrument is required based on a location may for example allow the controller to start the series of oscillatory translational and/or rotational movements without the input of a user. In addition, or instead, the controller may also suggest to the user that the setting up of the geodetic instrument is required.

In some embodiments, the geodetic instrument may include a location detection device. The location detection device may be for detecting a move of the geodetic instrument to a new location. The controller may be configured to determine that the setting up of the geodetic instrument is required based on an input from the location detection device.

In some embodiments, the geodetic instrument may include an attachment detection device. The attachment detection device may be for detecting when the geodetic instrument gets attached to the holding arrangement with the attachment device. The controller may be configured to determine that the setting up of the geodetic instrument is required based on an input from the attachment detection device.

According to a second aspect of the present disclosure, a method of setting up a geodetic instrument is provided. The geodetic instrument may include an attachment device for attaching the geodetic instrument to a holding arrangement. The geodetic instrument may further include at least a part which is rotatable and/or translatable relative to the holding arrangement.

The method may include determining that a setting up of the geodetic instrument is required. The method may further include causing, upon determining that the setting up of the geodetic instrument is required, a series of oscillatory rotational and/or translational movements of the at least a part of the geodetic Instrument. Advantages of the method of the second aspect may be the same as those described earlier herein with reference to the geodetic instrument of the first aspect, or to the geodetic instrument of the third aspect which will be described later below.

In some embodiments, the at least a part of the geodetic instrument may be part of a motorized positioning arrangement. The motorized positioning arrangement may be for aiming a line of sight of the geodetic instrument relative to the holding arrangement. Causing the series of oscillatory rotational and/or translational movements of the at least a part of the geodetic instrument may include providing a control sequence to the motorized positioning arrangement for causing the series of oscillatory rotational and/or translational movements.

According to a third aspect of the present disclosure, a geodetic instrument is provided. The geodetic instrument may be adapted to determine a direction and/or a distance to a target. The geodetic instrument may include an attachment device. The attachment device may be for attaching the geodetic instrument to a holding arrangement. The geodetic instrument may include a motor for rotating and/or translating at least a part of the geodetic instrument relative to the holding arrangement. The geodetic instrument may further include a controller. The controller may be configured to, upon determining that a setting up of the geodetic instrument is required, provide a control sequence to the motor for causing a series of oscillatory rotational and/or translational movements of the at least a part of the geodetic instrument.

The motor in the geodetic instrument according to the third aspect may not necessarily form part of a motorized positioning arrangement as defined above. Instead, the motor may be provided only to cause the oscillatory rotational and/or translational movements, and the motor may be specifically tailored for this purpose. This may for example allow the motor to be installed as an additional component on an already existing geodetic instrument.

The present disclosure relates to all possible combinations of features recited in the claims. Further, any embodiment described with reference to a geodetic instrument according to the first aspect of the present disclosure may be combinable with the method of the second aspect and/or the geodetic instrument of the third aspect, or vice versa.

Further objects and advantages of the various embodiments of the present disclosure will be described below by means of exemplifying embodiments.

BRIEF DESCRIPTION OF THE DRAWINGS

Exemplifying embodiments will be described below with reference to the accompanying drawings, in which.

Figure 1:
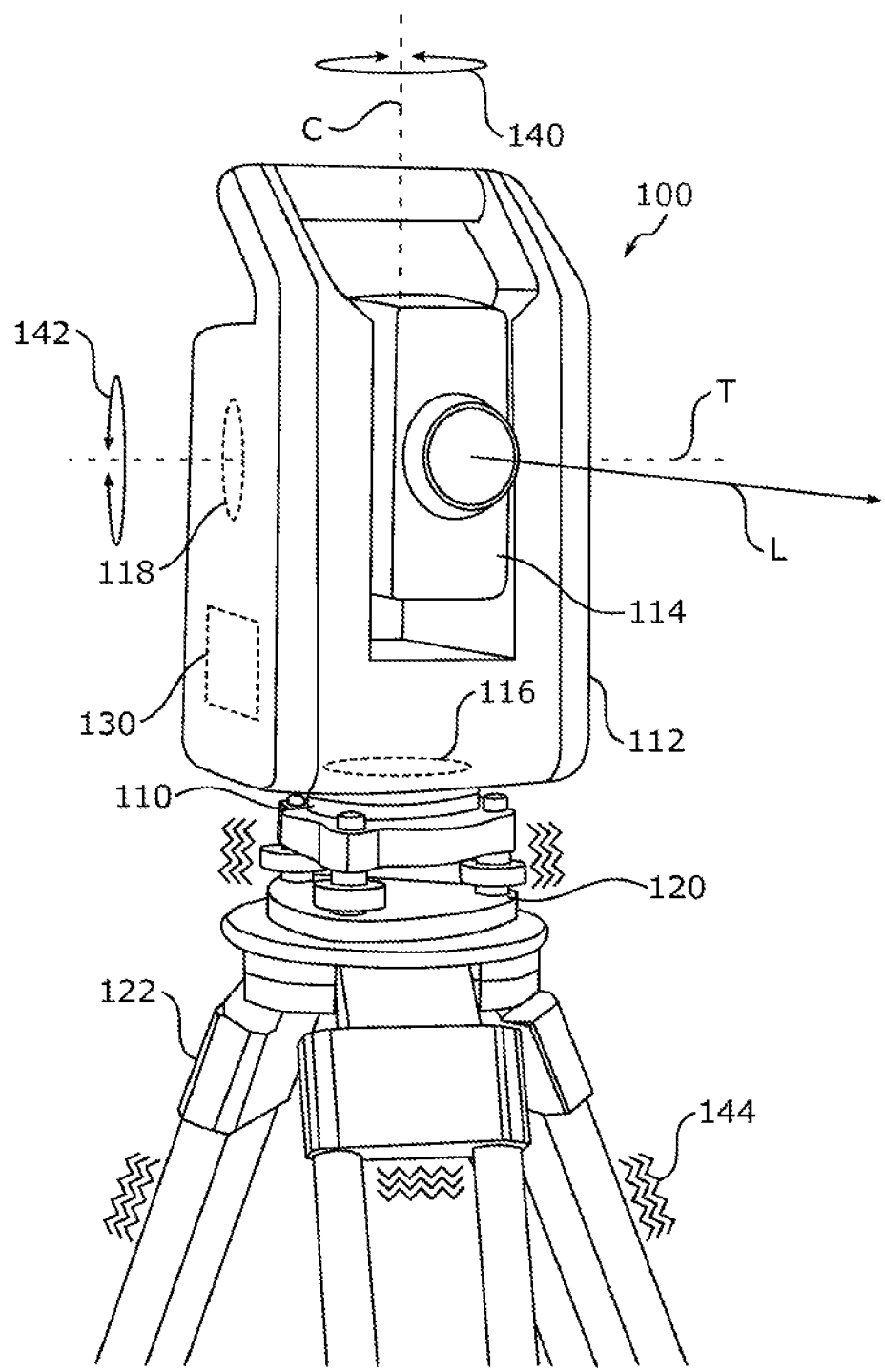
FIG. 1 illustrates schematically an embodiment of a geodetic instrument according to the present disclosure.

In the drawings, like reference numerals will be used for like elements unless stated otherwise. Unless explicitly stated to the contrary, the drawings show only such elements that are necessary to illustrate the example embodiments, while other elements, in the interest of clarity, may be omitted or merely suggested. As illustrated in the figures, the sizes of elements and regions may be exaggerated for illustrative purposes and, thus, are provided to illustrate the general structures of the embodiments.

DETAILED DESCRIPTION

Exemplifying embodiments will now be described more fully hereinafter with reference to the accompanying drawings. The drawings show currently preferred embodiments, but the invention may, however, be embodied in many different forms and should not be construed as limited to the embodiments set forth herein; rather, these embodiments are provided for thoroughness and completeness, and fully convey the scope of the present disclosure to the skilled person.

With reference to FIG. 1, a geodetic instrument for determining a direction and/or a distance to a target will now be described in more detail.

FIG. 1 illustrates schematically a geodetic instrument 100 in form of a total station. The geodetic instrument 100 includes a base 110 and an alidade 112 which is mounted on the base 110 such that the alidade 112 may rotate around a center axis C. The geodetic instrument 100 further includes a center unit 114 which is mounted on the alidade 112 such that the center unit may rotate around a trunnion axis T. To rotate the alidade 112 around the center axis C (to change e.g. an azimuthal angle), the geodetic instrument 100 includes a first motor 116. To rotate the center unit 114 around the trunnion axis T (to change e.g. an elevation angle), the geodetic instrument includes a second motor 118. The alidade 112, the center unit 114, the first motor 116 and the second motor 118 form part of a motorized positioning arrangement which may be used to aim a line of sight L of the geodetic instrument 100. By aiming the line of sight L towards a specific target, the geodetic instrument 100, or an operator using the geodetic instrument 100, may decide for example a direction to the specific target. The geodetic instrument 100 may also include e.g. an electronic distance measuring device (not shown in FIG. 1), such that also a distance to the specific target may be determined. An electronic distance measuring device may for example function by emitting radiation towards a target, by receiving at least a part of this radiation which has reflected from the target, and by then calculating the distance to the target based on the emitted and received radiation. For example, the electronic distance measuring device may emit a pulse of light, receive a reflected pulse of light, and calculate the distance to the target by determining the time that has elapsed between the emission of the emitted pulse and the reception of the reflected pulse. Other examples may include using ultrasound, radar, or other suitable technologies.

The geodetic instrument 100 includes an attachment device 120 through which the geodetic instrument 100 may be attached to a holding arrangement. In FIG. 1, the attachment device is in the form of a tribrach 120 and the holding arrangement is in the form of a tripod 122. The tribrach 120 attaches the base 110 of the geodetic instrument 100 to the tripod 122. In other embodiments, it may be envisaged that the attachment device does not include a tribrach, but that the attachment device is such that it for example attaches the base of the geodetic instrument directly to the holding arrangement. The attachment device may then be for example a screw or similar.

The geodetic instrument 100 further includes a controller 130. The controller 130 is configured to determine that a setting up of the geodetic instrument 100 is required. This may be achieved e.g. by an input from an operator of the geodetic instrument 100, from a signal indicative of a location, or a change of a location, of the geodetic instrument 100, or similar. The operator of the geodetic instrument 100 may for example signal to the controller 130 that the setting up is required by pressing for example a button on a control panel (not shown in FIG. 1) of the geodetic instrument 100.

The controller 130 is further configured to, after it has determined that the setting up of the geodetic instrument 100 is required, provide a control sequence to the motorized positioning arrangement to cause a series of oscillatory rotational and/or translational movements of at least a part of the motorized positioning arrangement. In the embodiment of the geodetic instrument 100 as Illustrated in FIG. 1, the controller 130 may provide the control sequence to the first motor 116 and the second motor 118. The first motor 116 may cause a series of oscillatory rotational movements 140 of the alidade 112 around the center axis C. The second motor 118 may cause, as an alternative or in addition to the movements induced by the first motor 116, a series of oscillatory rotational movements 142 of the center unit 114 around the trunnion axis T.

The oscillatory rotational movements 140 and 142 may induce vibrations 144 in the tribrach 120 and in the tripod 122. These vibrations 144 may help to more quickly release frictional tension which may have been built up in the holding arrangement (e.g. in the tripod 122) and in the attachment device (e.g. in the tribrach 120). This may more quickly reduce or remove the effects of hysteresis and improve the reliability of the geodetic instrument 100 over time, e.g. by preventing or at least partly preventing drift of for example a backsight reference established after the vibrations 144 have been induced.

In the embodiment of the geodetic instrument 100 as shown in FIG. 1, the oscillatory movements include the rotational movements 140 and 142. It may however be envisaged that also other rotational and/or translational movements may be included, and/or that only one of the rotational movements 140 and 142 are used. The geodetic instrument 100 may for example include other motors which may for example tilt the alidade 112 relative to the base 110, or translate the alidade 112 relative to the base 110. In some embodiments, it may for example also be envisaged that the geodetic instrument 100 includes also one or more motors arranged not to aim the line of sight L of the geodetic instrument 100, but only to cause rotational and/or translational oscillatory movements of the geodetic instrument relative to the holding arrangement such that further vibrations may be induced in the holding arrangement (and in the attachment device).

As used herein, the term "holding arrangement" may include also, or instead, other structures. Examples may include wall mounts such as e.g. wall/column brackets, vehicle mounts, ceiling mounts, and similar. Frictional tensions may build up during e.g. mounting/installation of the geodetic instrument on such other holding arrangements. The vibrations induced by the geodetic instrument of the present disclosure may help to more quickly release such frictional tension, and to reduce or remove the effects of hysteresis.

Figure 2:
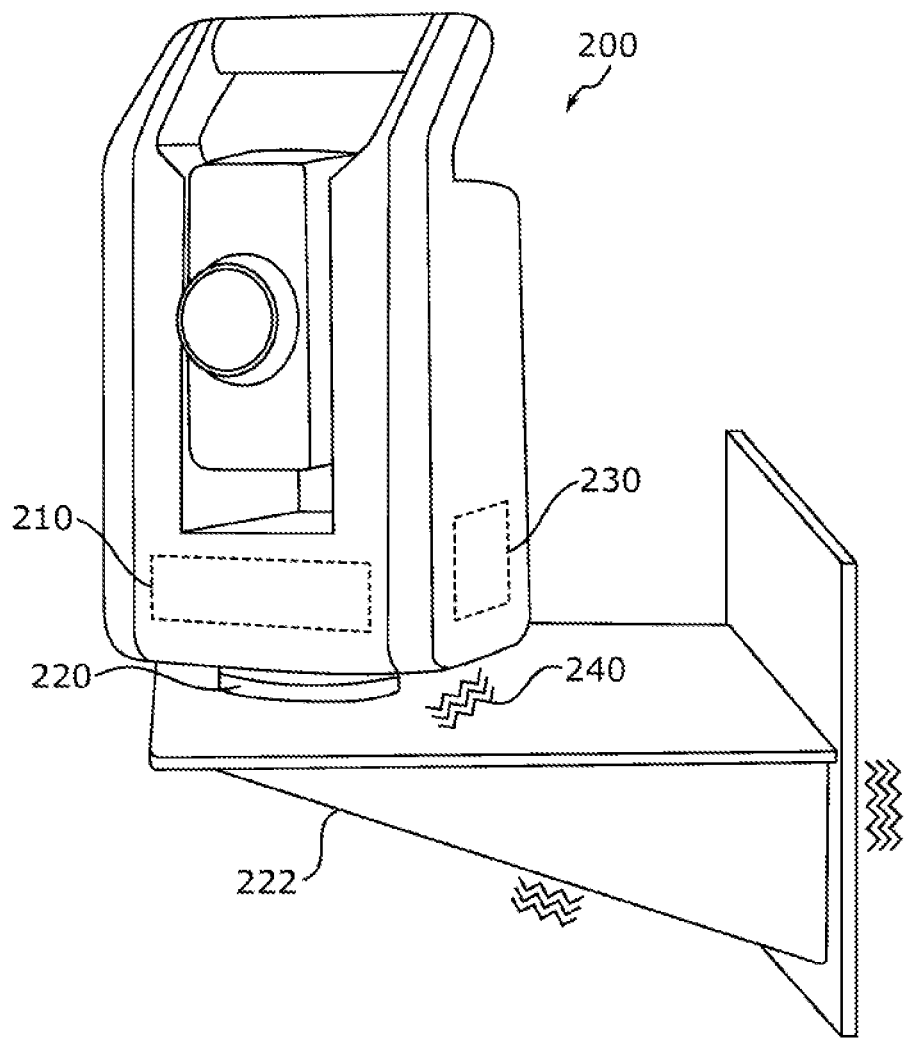
FIG. 2 illustrates schematically an embodiment of a geodetic instrument according to the present disclosure.

With reference to FIG. 2, one embodiment of a geodetic instrument according to the present disclosure will now be described in more detail.

FIG. 2 illustrates schematically a geodetic instrument 200. The geodetic instrument 200 includes an electronic distance meter and a sighting device which the operator, and/or the instrument itself, may use to determine for example a direction and/or a distance to a target.

The geodetic instrument 200 includes an attachment device 220 with which the geodetic instrument 200 is attached to a holding arrangement. In FIG. 2, the holding arrangement is in the form of a wall mount/bracket 222. The attachment device 220 includes a base of the geodetic instrument 220 and a screw (not shown in FIG. 2) which attaches the geodetic instrument 200 to the wall mount/bracket 222.

The geodetic instrument 200 further includes a motor 210. The motor 210 may rotate and/or translate at least part of the geodetic instrument 200 relative to the holding arrangement (e.g. the wall mount/bracket 222). The motor 210 may for example rotate at least a part of the geodetic instrument 220 relative to the base 220 and the wall mount/bracket 222. The motor 210 may for example translate at least a part of the geodetic instrument 220 relative to the base 220 and the wall mount/bracket 222. Alternatively, the motor 210 may for example be a device specifically intended to cause vibrations in the geodetic instrument 220.

The geodetic instrument 200 includes a controller 230. The controller 230 is configured to determine that a setting up of the geodetic instrument 230 is required. The controller 230 may for example determine that the setting up of the geodetic instrument 230 in similar ways as the controller 130 of the embodiment of the geodetic instrument 100 described with reference to FIG. 1. When the controller 230 has determined that the setting up of the geodetic instrument 200 is required, the controller 230 may provide a control sequence to the motor 210. The control sequence may control the motor 210 to cause a series of oscillatory rotational and/or translational movements of at least a part of the geodetic instrument 200, as described above.

The series of oscillator rotational and/or translational movements may induce vibrations 240 both in for example the attachment device 220 and in the holding arrangement (wall mount/bracket) 222. The induced vibrations 240 may help to more quickly release frictional tension which may have been built up in for example the wall mount/bracket 222 during installation/mounting. This may, as described earlier herein, allow the geodetic instrument 200 to reduce and possibly remove the effects of hysteresis which may otherwise cause drift over time of for example a backsight reference.

Figure 3:
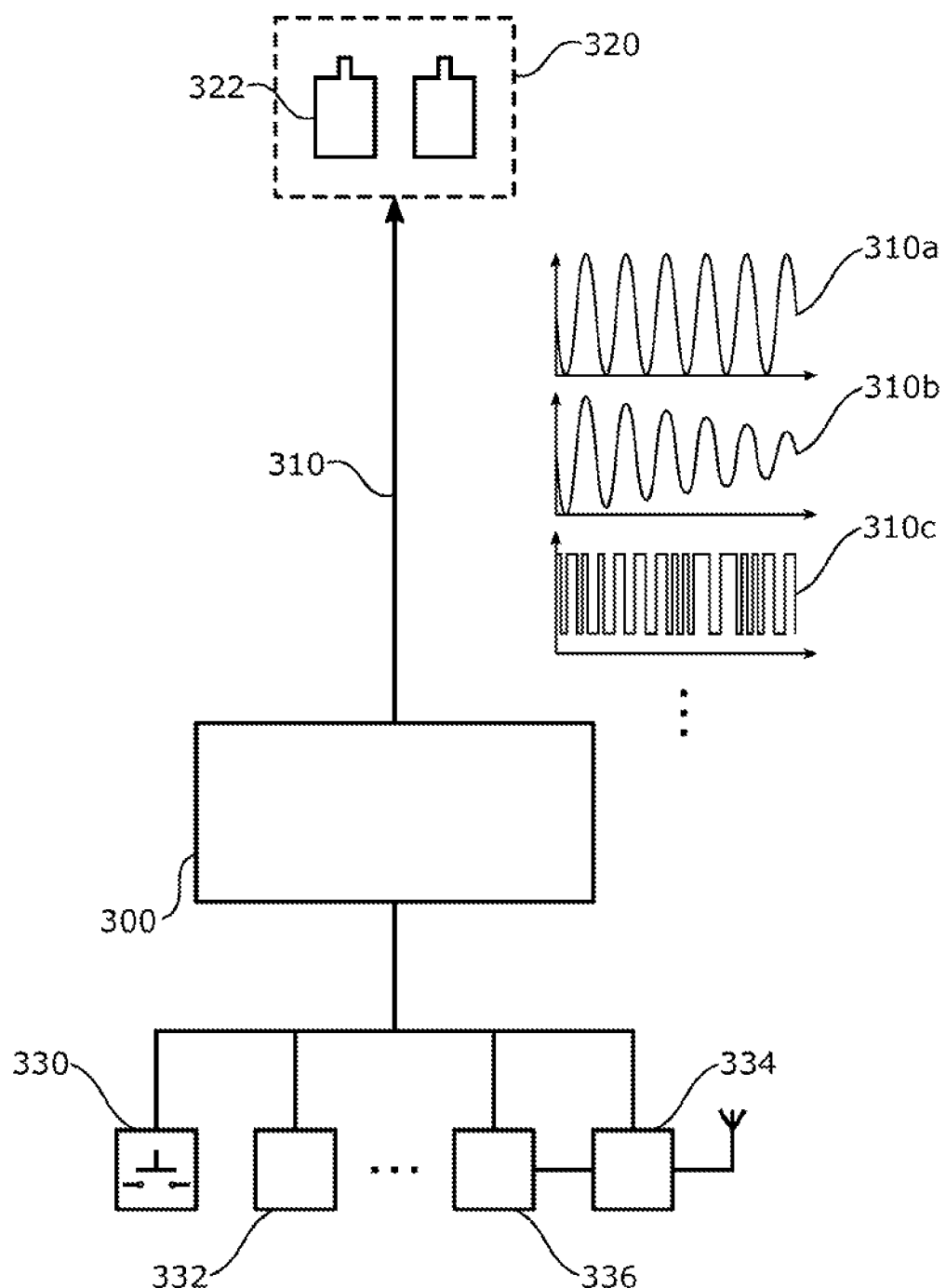
FIG. 3 illustrates schematically a controller in embodiments of a geodetic instrument according to the present disclosure.

With reference to FIG. 3, a more detailed description of the functioning of a controller will be given below.

FIG. 3 illustrates schematically a controller 300 as included in a geodetic instrument according to the present disclosure (e.g. the controller 130 in the embodiment of the geodetic instrument 100 as shown in FIG. 1, or the controller 230 in the embodiment of the geodetic instrument 200 as shown in FIG. 2).

The controller 300 may provide a control sequence 310 to one or more motors 322 of the geodetic instrument. The one or more motors 322 may be part of for example a motorized positioning arrangement 320, which may be used to for example aim a line of sight of the geodetic instrument. The control sequence 310 may for example be periodic (as illustrated by the control sequence 310a), have a decreasing amplitude with time (as illustrated by the control sequence 310b), and/or assume the form of a telegraph process (as illustrated by the control sequence 310c). It is envisaged that the control sequence 310 may also assume other forms. As described earlier herein, the control sequence 310 may control the one or more motors 322 to cause a series of oscillatory translational and/or rotational movements of at least a part of the geodetic instrument relative to a holding arrangement on which the geodetic instrument is mounted. The series of oscillatory translational and/or rotational movements may induce vibrations in the holding arrangement, which may help to more quickly release frictional tension and reduce or even remove the effects of hysteresis.

Before the control sequence 310 is provided to the one or more motors 322 by the controller 300, the controller 300 determines that a setting up of the geodetic instrument is required.

To determine that the setting up of the geodetic instrument is required, and to generate a suitable control sequence, the controller 300 may receive one or more indications and/or inputs from one or more devices. In FIG. 3, examples of such devices are illustrated as a switch/button 330, an attachment detection device 332, a location detection device 334, and/or a surface type detection device 336. The controller 300 may of course receive such indications and/or inputs from one or more other types of devices than those illustrated in FIG. 3, as long as such one or more other devices may provide the required indications and/or inputs to the controller 300. It is also envisaged that some or all of the devices are integrated parts of the controller 300.

The switch/button 330, if included, may for example be a button on a control panel of the geodetic instrument, or elsewhere. The button may be a physical button, or for example be a graphical button which forms part of a user interface to the geodetic instrument. The button may, in some embodiments, be located on a control device (such as a remote control) which is separate from the geodetic instrument but which may communicate with the geodetic instrument over for example a wired and/or wireless link. After having for example pitched a tripod and mounted the geodetic instrument to the tripod (using for example a tribrach), an operator may for example press the button to allow the controller 300 to determine that a setting up of the geodetic instrument is required. The controller 300 may then provide the control sequence 310 to the one or more motors 322. The switch/button 330 may also be replaced by other types of input devices, which the operator may use to provide the controller 300 with an indication that a setting up of the geodetic instrument is required.

The attachment detection device 332, if included, may for example be a switch located such that the state of the switch changes when e.g. an operator mounts the geodetic instrument on the holding arrangement using an attachment device. The switch may then provide a signal to the controller 300 indicating that the setting up of the geodetic instrument is required, and the controller 300 may provide the control sequence 310 to the one or more motors 322. The attachment detection device 332 may also be for example a scale, or similar. In general, the attachment detection device 332 may be a device which may discriminate between a "mounted/assembled" state and an "unmounted/disassembled" state of the geodetic instrument on the holding arrangement.

The location detection device 334, if included, may for example include a positioning device such as a GPS receiver (or similar receivers, such as for example GLONASS, BeiDou, etc.), or use other types of e.g. radio communication to receive and/or calculate its position. The location detection device 334 may for example detect that the geodetic instrument has been moved to a new location, and that the setting up of the geodetic instrument is required.

The surface type detection device 336, if Included, may Indicate a surface type at which the geodetic instrument (using the holding arrangement) is currently located. The controller 300 may receive this indication and base the control sequence thereon. For example, the surface type detection device 336 may detect that the holding arrangement is currently on a grass surface, and the controller 300 may provide a control sequence 310 suitable for the grass surface to the one or more motors 322. In another example, the surface detection device 336 may instead detect that the holding arrangement is currently on a tarmac surface, and the controller 300 may act accordingly and provide a different (if required) control sequence 310 to the one or more motors 322, etc. The surface type detection device 336 may include one or more sensors for detecting the surface type, and/or for example receive the current position of the geodetic instrument from the location detection device 334 and calculate the surface type based thereon (using for example a map between position and surface types).

As described earlier herein, the controller 300 may determine that the setting up of the geodetic instrument is required using, in addition or instead, other indications and/or inputs which are not illustrated in FIG. 3.

Figure 4:
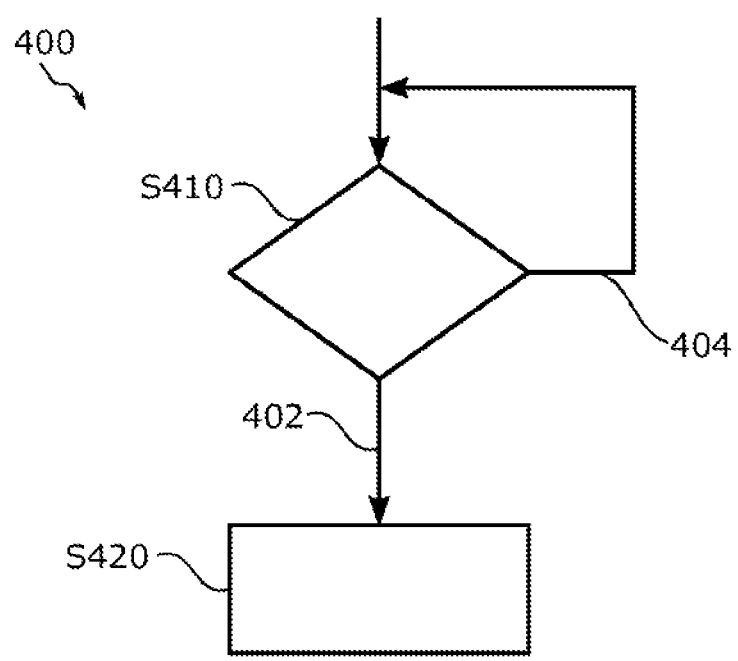
FIG. 4 illustrates schematically a flowchart of a method of setting up a geodetic instrument according to the present disclosure.

With reference to FIG. 4, a method of setting up a geodetic instrument will be described in more detail below.

FIG. 4 illustrates schematically a flowchart of a method 400 according to the present disclosure. In a step S410, it may be determined whether a setting up of the geodetic instrument is required. If it is determined that a setting up of the geodetic instrument is required in step S410, the method 400 may proceed (path 402) to a step S420. In step S420, a series of oscillatory rotational and/or translational movements of at least a part of the geodetic instrument may be caused. As described earlier, the series of oscillatory movements may induce vibrations in a holding arrangement to which the geodetic instrument is connected (or mounted on). These vibrations may reduce or remove the effects of hysteresis in the holding arrangement.

If it is not determined that a setting up of the geodetic instrument is required in step S410, the method 400 may continue to reevaluate whether the setting up of the geodetic instrument is required (path 404).

In the method 400, the at least a part of the geodetic instrument may be part of a motorized positioning arrangement for aiming a line of sight of the geodetic instrument (as described with reference to the embodiment of the geodetic instrument 100 illustrated in FIG. 1). The line of sight may be aimed by rotation and/or translation of the at least a part of the geodetic instrument relative to the holding arrangement. Causing the series of oscillatory rotational and/or translational movements of the at least a part of the geodetic instrument may include to provide a control sequence to the motorized positioning arrangement. This may cause the series of oscillatory rotational and/or translational movements.

The present disclosure provides a geodetic instrument in which rotational and/or translational movements of at least a part (such as a motorized positioning system) of the geodetic instrument is used, after it is determined that a setting up of the geodetic instrument is required, to induce vibrations in a holding arrangement to which the geodetic instrument is mounted. The vibrations may help to more quickly release frictional tension which may be built up in the holding arrangement. This may reduce or remove the effects of hysteresis, and reduce or avoid drift of for example a backsight reference or a tilt of the geodetic instrument. After the vibrations have been induced, the backsight reference may be establish and the setting up of the geodetic instrument may be completed. By inducing the vibrations in the holding arrangement, the drift in this backsight reference over time, after the setting up of the geodetic instrument has been completed, may be reduced or possibly removed.

The person skilled in the art realizes that the present disclosure is by no means limited to the embodiments described above. On the contrary, many modifications and variations are possible within the scope of the appended claims.

Although features and elements are described above in particular combinations, each feature or element may be used alone without the other features and elements or in various combinations with or without other features and elements.

Additionally, variations to the disclosed embodiments can be understood and effected by the skilled person in practicing the claimed invention, from a study of the drawings, the disclosure, and the appended claims. In the claims, the word "comprising" does not exclude other elements, and the indefinite article "a" or "an" does not exclude a plurality. The mere fact that certain features are recited in mutually different dependent claims does not indicate that a combination of these features cannot be used to advantage.

The invention claimed is:

1. A geodetic instrument adapted to determine a direction and/or a distance to a target, comprising:
   an attachment device for attaching the geodetic instrument to a holding arrangement;
   a motorized positioning arrangement for aiming a line of sight of the geodetic instrument via rotation and/or translation of at least a part of the motorized positioning arrangement relative to the holding arrangement, and
   a controller configured to, upon determining that a setting up of the geodetic instrument is required, provide a control sequence to the motorized positioning arrangement for causing a series of oscillatory rotational and/or translational movements of said at least a part of the motorized positioning arrangement, wherein an envelope amplitude of the series of oscillatory rotational and/or translational movements decreases with time.

2. The geodetic instrument of claim 1, wherein the control sequence follows a telegraph process in which a variable randomly switches between two distinct values.

3. The geodetic instrument of claim 1, wherein the series of oscillatory rotational and/or translational movements has a constant power spectral density.

4. The geodetic instrument of claim 1, wherein the controller is configured to determine a resonance frequency of the holding arrangement, and wherein the control sequence is based upon said determined resonance frequency.

5. The geodetic instrument of claim 1, wherein the controller is configured to determine a surface type on which the holding arrangement is positioned, and wherein the control sequence is based upon said determined surface type.

6. The geodetic instrument of claim 5, wherein the controller is configured to determine the surface type based on a location of the geodetic instrument.

7. The geodetic instrument of claim 1, wherein a motor of the motorized positioning arrangement is a brushless electromagnetic motor or a piezoelectric motor.

8. The geodetic instrument of claim 1, wherein the attachment device includes a tribrach.

9. The geodetic instrument of claim 1, wherein said geodetic instrument is a total station comprising a theodolite and an electronic distance measuring device.

10. The geodetic instrument of claim 1, wherein the motorized positioning arrangement includes an alidade rotatably mounted on a base of the geodetic instrument, wherein the attachment device is configured to attach the base of the geodetic instrument to the holding arrangement.

11. The geodetic instrument of claim 10, wherein the alidade forms part of said at least a part of the motorized positioning arrangement, and wherein the series of oscillatory rotational and/or translational movements includes oscillatory rotational movements of the alidade around a center axis.

12. The geodetic instrument of claim 10, wherein said at least a part of the motorized positioning arrangement includes a center unit rotatably mounted on the alidade, and wherein the series of oscillatory rotational and/or translational movements includes oscillatory rotational movements of the center unit around a trunnion axis.

13. The geodetic instrument of claim 1, wherein the controller is configured to determine that the setting up of the geodetic instrument is required based on an input from a user.

14. The geodetic instrument of claim 1, wherein the controller is configured to determine that the setting up of the geodetic instrument is required based on a location of the geodetic instrument.

15. The geodetic instrument of claim 1, wherein the geodetic instrument includes a location detection device for detecting a move of the geodetic instrument to a new location, and wherein the controller is configured to determine that the setting up of the geodetic instrument is required based on an input from said location detection device.

16. The geodetic instrument of claim 1, wherein the geodetic instrument includes an attachment detection device for detecting when the geodetic instrument gets attached to the holding arrangement with the attachment device, and wherein the controller is configured to determine that the setting up of the geodetic instrument is required based on an input from said attachment detection device.

17. A method of setting up a geodetic instrument, said geodetic instrument including an attachment device for attaching the geodetic instrument to a holding arrangement, and at least a part which is rotatable and/or translatable relative to the holding arrangement, said method comprising:

determining that a setting up of the geodetic instrument is required, and causing, upon determining that the setting up of the geodetic instrument is required, a series of oscillatory rotational and/or translational movements of said at least a part of the geodetic instrument, wherein an envelope amplitude of the series of oscillatory rotational and/or translational movements decreases with time.

18. The method of claim 17, wherein said at least a part of the geodetic instrument is part of a motorized positioning arrangement for aiming a line of sight of the geodetic instrument via rotation and/or translation of said at least a part of the geodetic instrument relative to the holding arrangement, and wherein said causing the series of oscillatory rotational and/or translational movements of said at least a part of the geodetic instrument includes providing a control sequence to the motorized positioning arrangement for causing the series of oscillatory rotational and/or translational movements.

19. A geodetic instrument adapted to determine a direction and/or a distance to a target, comprising:

an attachment device for attaching the geodetic instrument to a holding arrangement;

a motor for rotating and/or translating at least a part of the geodetic instrument relative to the holding arrangement, and a controller configured to, upon determining that a setting up of the geodetic instrument is required, provide a control sequence to the motor for causing a series of oscillatory rotational and/or translational movements of said at least a part of the geodetic instrument, wherein an envelope amplitude of the series of oscillatory rotational and/or translational movements decreases with time.

* * * * *